United States Patent
Chandrasekaran et al.

(10) Patent No.: US 10,771,390 B2
(45) Date of Patent: Sep. 8, 2020

(54) TECHNIQUES FOR OPTIMIZING EGRESS TUNNEL ROUTER FAILURE SCENARIOS IN INTELLIGENT WIDE AREA NETWORKS

(71) Applicant: CISCO TECHNOLOGY, INC., San Jose, CA (US)

(72) Inventors: Ravishankar Chandrasekaran, Saratoga, CA (US); Rex Emmanuel Fernando, Dublin, CA (US); Sanjay Kumar Hooda, Pleasanton, CA (US); Jesus Arango, San Ramon, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/626,150

(22) Filed: Jun. 18, 2017

(65) Prior Publication Data
US 2018/0367459 A1 Dec. 20, 2018

(51) Int. Cl.
*H04L 12/813* (2013.01)
*H04L 12/46* (2006.01)
*H04L 12/751* (2013.01)

(52) U.S. Cl.
CPC .......... *H04L 47/20* (2013.01); *H04L 12/4633* (2013.01); *H04L 45/02* (2013.01)

(58) Field of Classification Search
CPC .............................. H04L 47/20; H04L 12/4633
See application file for complete search history.

(56) References Cited

U.S. PATENT DOCUMENTS

| | | | | |
|---|---|---|---|---|
| 8,014,275 B1* | 9/2011 | Sundt | .................. | H04L 41/0668 370/217 |
| 8,908,539 B1* | 12/2014 | Pani | .................... | H04L 43/0811 370/248 |
| 2003/0086425 A1* | 5/2003 | Bearden | .............. | H04L 41/0213 370/392 |
| 2003/0235158 A1* | 12/2003 | Lee | ........................ | H04L 45/26 370/256 |

(Continued)

OTHER PUBLICATIONS

Farinacci, D., et al., "The Locator/ID Separation Protocol (LISP)," Network Working Group, Internet-Draft, May 2, 2017, 53 pages; https://tools.ietf.org/pdf/draft-ietf-lisp-rfc6830bis-03.pdf.

(Continued)

*Primary Examiner* — Jael M Ulysse

(57) ABSTRACT

One embodiment of a method includes receiving at a first network node traffic from a second network node; and sending by the first network node to a third network node information identifying the second network node via a Local Area Network ("LAN") connection between the first and third network nodes. Subsequent to receipt of the information identifying the second network node, the third network node updates a locator table maintained by the third network node to include an entry including the information identifying the second network node received by the third network node from the first network node. Upon receipt by the third network node of a notification that the first network node has failed, the third network node sends an update only to network nodes that have an entry in the locator table indicating that the first network node has failed.

20 Claims, 5 Drawing Sheets

(56) References Cited

U.S. PATENT DOCUMENTS

| | | | |
|---|---|---|---|
| 2005/0125542 A1* | 6/2005 | Zhu | H04L 63/16 709/227 |
| 2005/0174984 A1* | 8/2005 | O'Neill | H04L 45/58 370/349 |
| 2006/0126495 A1* | 6/2006 | Guichard | H04L 41/0677 370/216 |
| 2006/0187845 A1* | 8/2006 | Busi | H04J 3/14 370/244 |
| 2008/0112322 A1* | 5/2008 | Bardalai | H04L 45/00 370/235 |
| 2008/0123651 A1* | 5/2008 | Vasseur | H04L 12/4633 370/392 |
| 2009/0003232 A1* | 1/2009 | Vaswani | H04L 45/00 370/252 |
| 2009/0003356 A1* | 1/2009 | Vaswani | H04L 45/00 370/400 |
| 2009/0059799 A1* | 3/2009 | Friskney | H04L 41/0681 370/241.1 |
| 2009/0316574 A1* | 12/2009 | Winter | H04L 45/00 370/225 |
| 2010/0039931 A1* | 2/2010 | Shi | H04L 45/02 370/216 |
| 2010/0153787 A1* | 6/2010 | Beattie, Jr. | H04L 41/0681 714/43 |
| 2010/0157894 A1* | 6/2010 | Park | H04L 12/4633 370/328 |
| 2010/0189113 A1* | 7/2010 | Csaszar | H04L 45/00 370/400 |
| 2010/0316054 A1* | 12/2010 | Xu | H04L 12/4633 370/392 |
| 2011/0019534 A1* | 1/2011 | Ramakrishnan | H04L 45/00 370/217 |
| 2012/0044813 A1* | 2/2012 | Nandagopal | H04L 45/28 370/242 |
| 2012/0179798 A1* | 7/2012 | Pafumi | G06F 9/5072 709/223 |
| 2013/0058345 A1* | 3/2013 | Kano | H04L 12/4633 370/392 |
| 2013/0198369 A1* | 8/2013 | Kim | H04L 61/103 709/224 |
| 2013/0227108 A1* | 8/2013 | Dunbar | H04L 12/4633 709/223 |
| 2014/0022901 A1* | 1/2014 | Suzuki | H04L 49/15 370/235 |
| 2014/0304231 A1* | 10/2014 | Kamath | G06F 16/27 707/634 |
| 2014/0317259 A1* | 10/2014 | Previdi | H04L 61/30 709/223 |
| 2014/0369185 A1* | 12/2014 | Chen | H04L 45/50 370/221 |
| 2015/0063317 A1 | 3/2015 | Moreno | |
| 2015/0372898 A1* | 12/2015 | Haramaty | H04L 49/557 370/225 |
| 2016/0119196 A1 | 4/2016 | Comeras et al. | |
| 2016/0173405 A1* | 6/2016 | Freitas | H04L 61/2007 709/213 |
| 2016/0352617 A1 | 12/2016 | Wang et al. | |
| 2016/0366051 A1* | 12/2016 | Chen | H04L 45/50 |
| 2017/0242761 A1* | 8/2017 | Markus | G06F 11/1658 |

OTHER PUBLICATIONS

D. Farinacci et al., "LISP Predictive RLOCs", draft-ietf-lisp-predictive-rlocs-03, Network Working Group, Internet-Draft, Intended status: Experimental, Nov. 19, 2018, 15 pages.

D. Farinacci et al., "The Locator/ID Separation Protocol (LISP)", Internet Engineering Task Force (IETF), Request for Comments: 6830, Category: Experimental, ISSN: 2070-1721, Jan. 2013, 75 pages.

Cisco, "Locator/ID Separation Protocol Commands", https://www.cisco.com/c/.../command/.../b-routing-cr53xasr9k_chapter_01101.pdf, downloaded Apr. 17, 2019, 54 pages.

G. Schudel et al., "Locator/ID Separation Protocol (LISP) MIB", Internet Engineering Task Force (IETF), Request for Comments: 7052, Category: Experimental, ISSN: 2070-1721, Oct. 2013, 66 pages.

H. Flinck et al., "Membership test for Mapping Information optimization draft-Hinck-lisp-membertest-00", LISP, Mar. 1, 2010, 12 pages.

D. Farinacci et al., "Locator/ID Separation Protocol Delegated Database Tree (LISP-DDT) Referral Internet Groper (RIG)", Independent Submission, May 2017, 11 pages.

Jason Gmitter, "Azure and LISP for Workload Migration", 15 pages, GitHub—microsoft/Azure-LISP: Leveraging Lisp pn Azure for Ip Mobility. -etrieved from Internet Apr. 8, 2020; https://github.comirnicrosoft/Azure-LISP.

D. Farinacci et al., "LISP EID Anonymity draft-farinacci-lisp-eid-anonymity-02", Network Working Group, Apr. 12, 2017, 9 pages.

Arista Networks, "Arista Networks and lispers. net: An Open Control Network (OCN)", YouTube, Feb. 6, 2015, last visited Apr. 8, 2020; https://www.youtube.com/watch?v=q0_4DgUJsl&feature=youtube&t=210.

\* cited by examiner

US 10,771,390 B2

TECHNIQUES FOR OPTIMIZING EGRESS TUNNEL ROUTER FAILURE SCENARIOS IN INTELLIGENT WIDE AREA NETWORKS

TECHNICAL FIELD

This disclosure relates in general to the field of communications networks and, more particularly, to techniques for optimizing egress tunnel router ("ETR") failure scenarios in intelligent wide area network ("iWAN").

BACKGROUND

Locator/Identifier Separation Protocol ("LISP") has three different mechanisms through which an ingress tunnel router ("ITR") can react to an egress tunnel router ("ETR") failure, or "down," event in a destination site, each of which has its own inherent limitations. The first such mechanism may be characterized as a routing monitor. In this mechanism, the ITR monitors remote routing locator ("RLOC") advertisements in the underlay routing protocol. RLOCs are advertised as /32 or /128 host routes. This mechanism is non-functional in deployments involving multiple autonomous systems or service providers due to the fact that host routes may be aggregated or filtered. The second such mechanism may be characterized as remote RLOC probing. Using this mechanism, the ITR periodically probes every RLOC appearing in its map-cache. Probing a very large set of RLOCs can have scalability implications due to the fact that the frequency with which every RLOC can be probed is inversely proportional to the number of RLOCs being probed, eventually decreasing to the point where target convergence times cannot be met. The third such mechanism may be characterized as locator status bits ("LSB"). In this mechanism, each ETR in the destination site locally probes the RLOCs of the other ETRs in the same site. The ETR can then report to the ITR in the source site the status of all the RLOCs in the destination site on data packets flowing in the reverse direction using the locator status bitmap located in the LISP header. This mechanism is dependent on the implementation of bidirectional traffic and not all data planes support this mechanism. Additionally, there is no guarantee that the mechanism will work with bidirectional traffic if the underlying transport is UDP. Consider a situation in which reverse traffic includes only acknowledgements to individual data packets arriving through the ETR that is about to fail. Once the failure occurs, no more acknowledgements will be generated on which LSBs can be piggy-backed.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
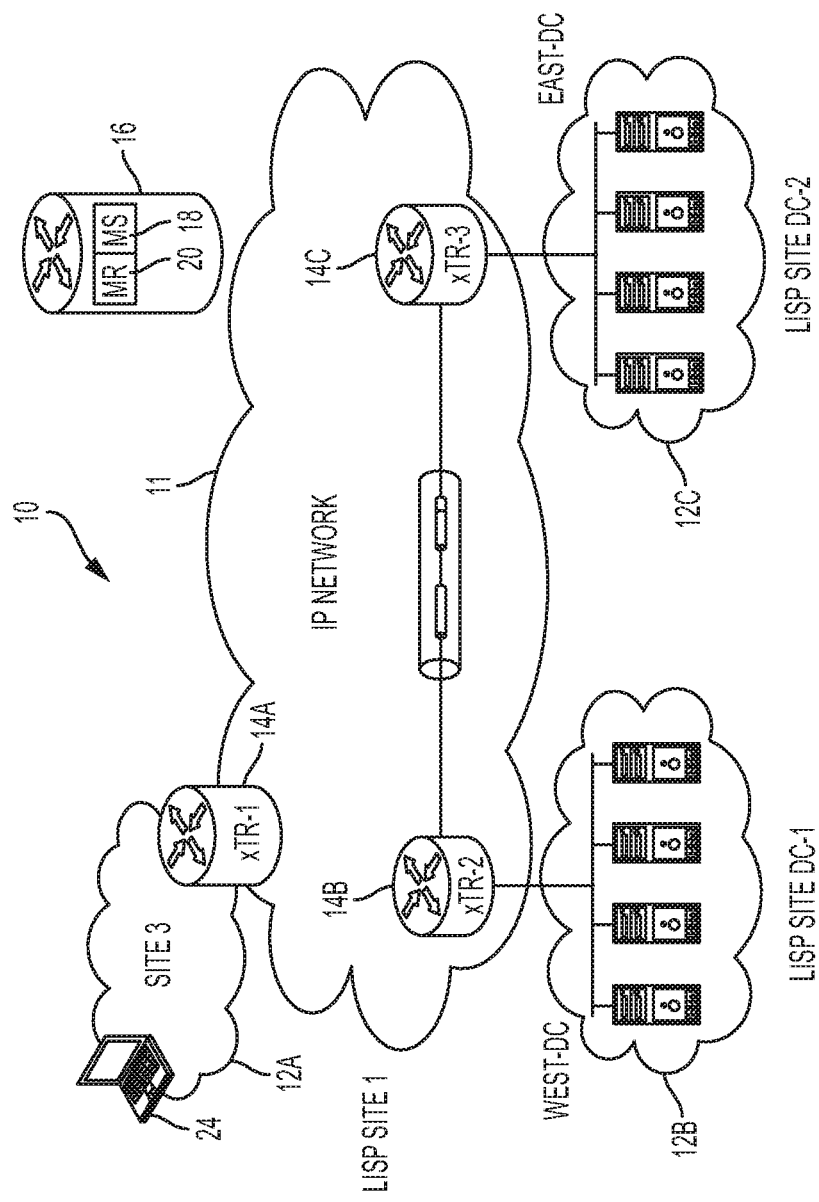
FIG. 1 is a simplified block diagram of a system in which techniques for optimizing ETR failure scenarios in an iWAN or other LISP-enabled network may be implemented.

A method is described and in one embodiment includes receiving at a first network node traffic from a second network node; and sending by the first network node to a third network node information identifying the second network node, wherein the first and third network nodes are peer nodes interconnected via a Local Area Network ("LAN") connection and wherein the information identifying the second network node is sent from the first network node to the third network node via the LAN connection. Subsequent to receipt of the information identifying the second network node, the third network node updates a locator table maintained by the third network node to include an entry corresponding to the second network node, wherein the entry includes the information identifying the second network node received by the third network node from the first network node. Additionally, upon receipt by the third network node via the LAN connection of a notification that the first network node has failed, the third network node sends an update only to network nodes that have a corresponding entry in the locator table indicating that the first network node has failed and to cease communication therewith.

In some embodiments, the method further includes, subsequent to the receiving, updating by the first network node a locator table maintained by the first network to include an entry corresponding to the second network node and including the information identifying the second network node sent by the first network node to the third network node. In certain embodiments, the first and third network nodes each comprise an egress tunnel router ("ETR") and the second network node comprises an ingress tunnel router ("ITR"). The second network node may be connected to the first network node and to the third network node via a Location Identifier Separation Protocol ("LISP")-enabled network. The locator table may be implemented as a remote routing locator ("RLOC") table and the table entry includes an RLOC of the second network node.

Embodiments may also include those in which, upon receipt by the third network node via the LAN connection of a notification that the first network node has failed, the third network node sends a plurality of updates only to network nodes that have a corresponding entry in the locator table indicating that the first network node has failed and to cease communication therewith, wherein each of the plurality of updates is sent at a predetermined interval.

Example Embodiments

The traditional IP addressing model associates both an identity and a location of a device to a single IP address space. This results in mobility being a very cumbersome process, as identity and location are so tightly bundled. LISP is a routing architecture in which an identifier of a device, referred to as its Endpoint Identifier ("EID"), and its location, identified by its Routing Locator ("RLOC"), are split into two different name spaces. LISP also provides a dynamic mapping mechanism between the two address families. RLOCs remain associated with the network topology and are reachable via traditional routing; however, EIDs can change location dynamically and are reachable at different RLOCs, depending on where an EID attaches to the network. In a virtualized data center deployment, EIDs can be directly assigned to virtual machines ("VMs") that are free to migrate between data center sites while preserving their IP addressing information.

LISP uses a dynamic tunneling encapsulation approach, rather than requiring the pre-configuration of tunnel endpoints. As previously noted, LISP name spaces include EID addresses, which include the IP address and prefixes identifying the endpoints, and RLOC addresses, which include the IP addresses and prefixes identifying the different routers in the network. EID reachability across LISP sites is achieved by resolving EID-to-RLOC mapping, while RLOC reachability is achieved by traditional routing methods. LISP sites may also include LISP site devices such as an Ingress Tunnel Router ("ITR") and an Egress Tunnel Router ("ETR"). An ITR may comprise a LISP site edge device that receives packets from site-facing interfaces, or internal hosts, encapsulates the packets, and forwards them to remote LISP sites. The ITR may alternatively natively forward the packets to non-LISP sites. An ETR may comprise a LISP site edge device that receives packets from core-facing interfaces, or the transport infrastructure, decapsulates LISP packets, and delivers them to local EIDs at the site.

The increasing use of virtualization in data center environments has enabled an unprecedented degree of flexibility in managing servers and workloads. A key to leveraging this flexibility is mobility; workloads hosted on virtual servers are decoupled from the physical infrastructure and become mobile by definition. As a result, the routing infrastructure is challenged to evolve from a topology-centric addressing model to a more flexible architecture that permits IP addresses to freely and efficiently move across the infrastructure. There are several ways of adding mobility to an IP infrastructure, each of which addresses the problem with different degrees of effectiveness. LISP host mobility is one such solution. Various details regarding LISP implementation can be found in Internet Engineering Task Force Request for Comments 6830 entitled "Locator/ID Separation Protocol (LISP)" ("IETF RFC 6830"), which is hereby incorporated by reference in its entirety.

It will be recognized that there are certain fundamental aspects that must be addressed in an IP mobility solution, such as LISP host mobility. These include redirection, scalability, routing optimization, client independence, and address family agnosticism. With regard to redirection, a primary goal of IP mobility is to direct traffic to the actual location of the specified end point. This goal is typically addressed by providing a redirection mechanism to enhance traffic steering already provided by the basic routing mechanism. This may be accomplished through replacing the destination's address or by leveraging a level of indirection in addressing such as may be achieved with tunnels and encapsulation. Ultimately, IP mobility should provide a solution that is totally transparent to the applications and allows for the preservation of established sessions, as endpoints move around the IP infrastructure. As for scalability, most IP mobility techniques create a significant amount of granular state to effectively redirect traffic, which granular state is necessary to correlate destination IP addresses to specific locations, either through mapping or translation. This increase in state must be handled efficiently to attain a solution that can support a deployable scale at a cost, in terms of memory and processing, that is not unreasonable.

With regard to routing optimization, as endpoints roam, traffic must still be routed to the endpoints via the best possible path. The ability to optimize the path is largely a function of the location of the redirecting element. A mobility solution must provide optimized paths regardless of the location of the endpoint. It is also important that the mobility solution not depend on agents installed on the endpoints or the clients communicating with the endpoints. The solution should therefore be network-based, given the large installed base of endpoints that presumably cannot be changed or managed at will to install client software. In the context of address family agnosticism, the IP mobility solution should work independently of IPv4 or IPv6 endpoints and network. Since mobility relies on manipulating the mapping of identity to location, address families with longer addresses tend to offer alternatives not available with shorter addresses. Address-dependent solutions have limited application because they generally require an end-to-end deployment of IPv6; the ideal solution should work for either IPv4 or IPv6.

As previously noted, the traditional IP addressing model associates both location and identity to a single IP address space, which makes mobility cumbersome. By providing two separate address spaces for location and identity, LISP provides a dynamic mapping mechanism. RLOCs remain associated with the topology and are reachable by traditional routing; however, EIDs can change location dynamically and are reachable via different RLOCs depending on where the EID attaches to the network. In a virtualized data center deployment, for example, EIDs can be assigned to virtual machines ("VMs") that are free to migrate between sites while preserving their IP addressing information. In this manner, LISP host mobility allows the EID space to be mobile without affecting the routing that interconnects the RLOC space. When a move from one LISP-enabled site to another is detected, EID-to-RLOC mappings are updated by the Ingress/Egress Tunnel Router ("xTR") of the new site. Moves are detected by configuring xTRs to compare the source in the IP header of traffic received from a host against a range of prefixes that are allowed to roam. These prefixes are defined as dynamic EIDs. When deployed at the first hop router (xTR), LISP devices also provide adaptable and comprehensive first hop router functionality to service the IP gateway needs of roaming devices that relocate.

In general, LISP host mobility functionality allows any IP-addressable device, or "host," to move, or "roam," from its subnet to another subnet or to a different location, such as a remote data center, while maintaining its original IP address. In the context of LISP, a device that moves may be referred to as a "roaming device," and its IP address is its EID. An xTR configured for LISP host mobility is typically positioned at the aggregation layer of a data center to enable the xTR function to be collocated on the device that functions as the default gateway. As will be described in detail below, LISP xTR devices dynamically determine when a workload moves into or away from one of its directly connected subnets.

Referring first to FIG. 1, illustrated therein is a simplified block diagram of a system 10 comprising features of a LISP-enabled IP network 11 in accordance with embodiments described herein. As shown in FIG. 1, the network 10 includes multiple LISP-enabled sites, represented in FIG. 1 by sites 12A, 12B, and 12C. In the illustrated embodiment, the site 12A is a remote LISP-enabled site and the sites 12B and 12C comprise data center sites. Each of the sites 12A-12C includes an xTR device, represented in FIG. 1 by xTRs 14A, 14B, and 14C, respectively. It will be noted that an xTR is a LISP site edge device that implements the functions of both an ITR and an ETR, thereby to enable establishment of bidirectional flows via the device. Each of the sites 12A-12C is connected to a server 16 via its respective xTR 14A-14C. The server 16 may comprise functionality for implementing both a Map-Server ("MS") 18 and a Map-Resolver ("MR") 20. The MS and MR (collectively MS/MR) are key components in a LISP deployment. They provide the ability to store and restore EID-to-RLOC mapping information for the LISP routers (xTRs) to route between LISP-enabled sites. The MS is a LISP infrastructure device with which the ETR functionality of each LISP-enabled site (implemented in the xTR of the site in the embodiment shown in FIG. 1) registers its EID prefix(s). The MS stores the registered EID prefixes in a mapping database with each EID prefix mapped to an associated RLOC. All LISP-enabled sites of the network 10 use the MS 18 to resolve EID-to-RLOC mappings. The MR is a LISP infrastructure device to which ITR functionality of each LISP-enabled site (implemented in the xTR of the site in the embodiment shown in FIG. 1) sends LISP map-request queries when resolving EID-to-RLOC mappings. Upon receipt of a map request query, the MR finds the appropriate EID-to-RLOC mapping by checking with the MS, which may be co-located or distributed. For purposes of illustration and example herein, it will be assumed that the MS and MR are collocated.

LISP functionality may consist of data plane and control plane functions. The steps required to establish communication between devices in LISP-enabled sites in accordance with embodiments described herein may include the following. First, a client, such as a client 24, in a remote LISP-enabled site, such as site 12A, queries through DNS the IP address of a destination server deployed at one of the LISP-enabled data center sites (sites 12B and 12C in FIG. 1). Next, traffic originating from the client is steered toward the local LISP-enabled device, which is usually the client's default gateway. The LISP-enabled device performs a lookup for the destination server in its routing table. Since the destination is an EID subnet, it is not present in the RLOC space, so the lookup fails, triggering the LISP control plane. The ITR functionality of the remote xTR (e.g., xTR 14A), receives valid mapping information from the mapping database and populates its local map cache. It should be noted that the destination EID subnet may be associated with RLOCs identifying the ETR functionality of multiple xTR devices at the data center LISP-enabled site. Also, each map cache entry may have associated therewith priority and weight values that are controlled by the destination site used to receive LISP encapsulated traffic designated to a local EID subnet. The weight allows tuning the amount of traffic received by the ETR functionality of each xTR in a load-balancing scenario. On the data plane, the ITR functionality of the xTR of the remote site performs LISP encapsulation of the IP traffic originated by the device and sends it to the transport infrastructure designed for one of the RLOCs of the ETR functionality of the data center xTRs. Assuming the priority and weight values are configured equally for the ETR functionality of each xTR device, the selection of the specific xTR RLOC may be performed on a per-flow basis based on hashing, for example.

Figure 2:
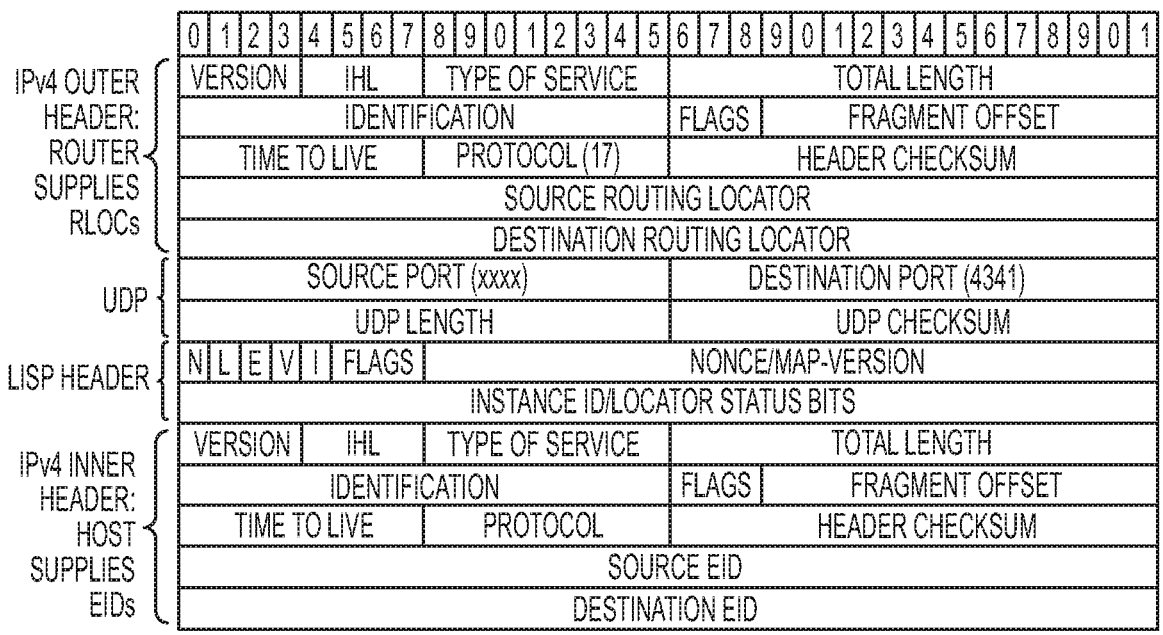
FIG. 2 illustrates an example format of a LISP encapsulated packet in accordance with embodiments shown and described herein for implementing techniques for optimizing ETR failure scenarios in an iWAN or other LISP-enabled network.

FIG. 2 illustrates the format of a LISP encapsulated packet in accordance with one embodiment. As shown in FIG. 2, LISP leverages a User Datagram Protocol ("UDP") encapsulation where the source port value is dynamically created and associated with each original flow to ensure better load balancing of traffic across the transport infrastructure. Finally, the ETR functionality at the data center xTR receives the packet, decapsulates it, and forwards it into the site toward the destination EID. It should be noted that a similar mechanism would be used for return traffic originated by the data center EID and destined for the client.

The LISP control plane may operate as follows. First, the ETR functionality of each xTR registers with the MS the one or more EID subnets that are locally defined and over which it has authority. Map-registration messages are sent periodically every 60 seconds by each xTR via its ETR functionality. Assuming that a local map cache entry is not available, when a client at a remote site wants to establish communication with a DC EID, a map-request is sent by the ITR functionality of the remote site xTR to the MR, which then forwards the message to the MS. The MS forwards the original map-request to the ETR functionality of the xTR that last registered the EID subnet. The ETR functionality of the xTR then sends a map-reply containing the requested mapping information to the ITR functionality of the remote xTR. The ITR functionality then installs the mapping information in a local map cache maintained by the remote xTR and begins encapsulating traffic toward the data center EID destination.

Embodiments described herein enable a new method of informing an ITR (which includes ITR functionality of an xTR) when an ETR (which includes ETR functionality of an xTR) at a remote site goes offline (or down). In accordance with an embodiment, when an ETR at a remote site goes down, a surviving ETR at the remote site informs an ITR previously in communication with the down ETR that the ETR is down using a triggered update (repeated N times). In particular, the ETRs maintain a list of RLOCs with which the remote site is communicating. In certain embodiments, the update is only provided to ITRs with which the down ETR was communicating, thereby avoiding unnecessary updates to unaffected ITRs.

Figure 3:
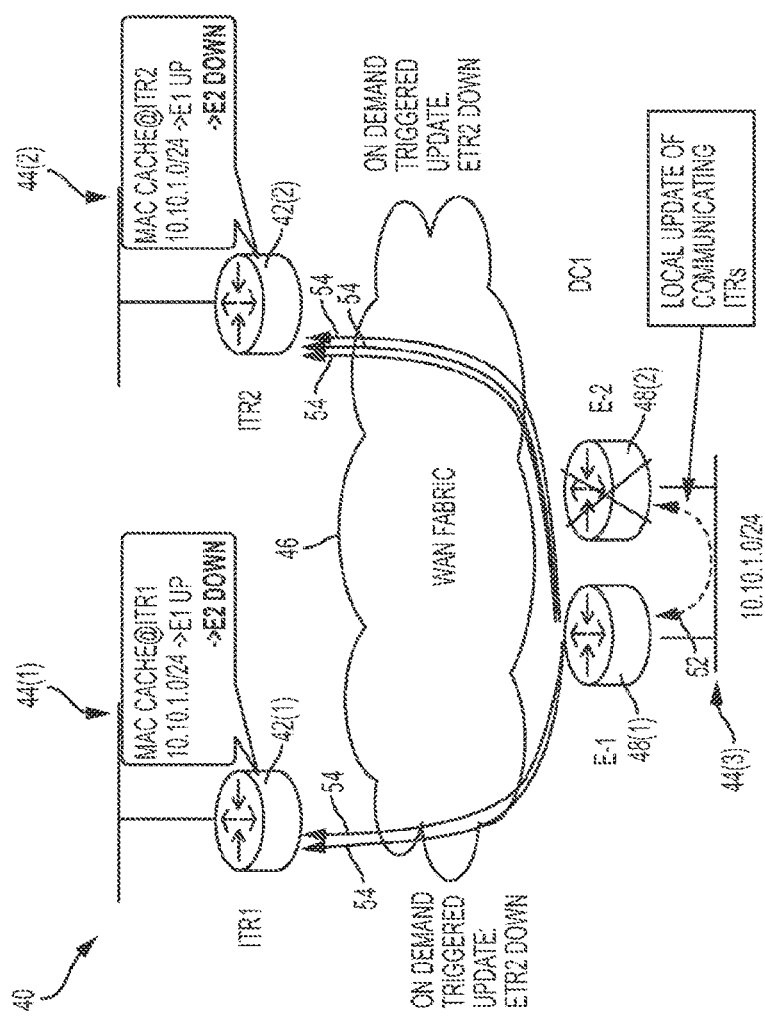
FIG. 3 illustrates a simplified block diagram of a system for implementing techniques for optimizing ETR failure scenarios in an iWAN in accordance with embodiments described herein.

FIG. 3 illustrates a simplified block diagram of a system 40 for implementing techniques for optimizing ETR failure scenarios in an iWAN or other LISP-enabled network in accordance with embodiments described herein. As shown in FIG. 3, the system 40 includes a plurality of ITRs, represented in FIG. 3 by ITRs 42(1), 42(2). In the embodiment illustrated in FIG. 3, the ITRs 42(1), 42(2) are disposed at different sites 44(1), 44(2), which sites are interconnected to each other and to a third site 44(3) via WAN fabric 46. Site 44(3) includes a plurality of ETRs, represented in FIG. 3 by ETRs 48(1), 48(2). It will be assumed that site 44(3) is a data center ("DC") site.

As will be described in detail below, it will be assumed for the sake of example that ITRs 42(1) and 42(2) are communicating with both ETR 48(1) and ETR 48(2) when ETR 48(2) goes down. In accordance with features of embodiments described herein, and as will be described in greater detail below, when ETR 48(2) goes down, its peer (i.e., ETR 48(1)) sends triggered updates to the ITRs that had been in communication with ETR 48(2) (i.e., ITR 42(1) and 42(2)). This is enabled by the fact that, prior to failure of ETR 48(2), the ETRs 48(1) and 48(2) are tracking which ITRs with which the site 44(3) is communicating.

In particular, when the WAN fabric 46 comes up based on the configuration provided by the user/administrator, ITR 42(1) begins communicating with site 44(3), sending traffic to ETR 48(2). Upon receipt of traffic from ITR 42(1), ETR 48(2) updates its remote RLOC table and sends an update to its peer (ETR 48(1)) that a new ITR (ITR 42(1)) has begun communication therewith, as represented in FIG. 3 by an arrow 52. Upon receipt of the update, ETR 48(1) updates its own remote RLOC table with the information for ITR 42(1). At this point, ITR 42(2) begins communicating with site 44(3), sending traffic to ETR 48(1). ETR 48(1) updates its remote RLOC table and sends an update to its peer (ETR 48(2) that a new ITR (ITR 42(2)) has begun communication therewith, as represented in FIG. 3 by the arrow 52. Upon receipt of the update, ETR 48(2) updates its own remote RLOC table with the information for ITR 42(2).

As a result of the foregoing, both ETRs 48(1), 48(2), have both ITRs 42(1), 42(2), listed in their respective remote RLOC tables. It will be assumed for the sake of example that at this point, ETR 48(2) goes down. As represented in FIG. 3 by an arrow 52, ETR 48(1) receives an update over local LAN advising it that ETR 48(2) has gone down. Upon receipt of this information, ETR 48(1) refers to its remote RLOC table and sends the multiple triggered updates. Multiple updates are sent so that if one or more of the updates is missed, the peer still knows that ETR 48(2) is down to all ITRs in its remote RLOC table (in this case, ITR 42(1), 42(2)), as represented in FIG. 3 by arrows 54. This is to ensure that the remote RLOC is able to stop encapsulating traffic to the 48(2) as soon as possible, thus avoiding traffic loss.

Figure 4:
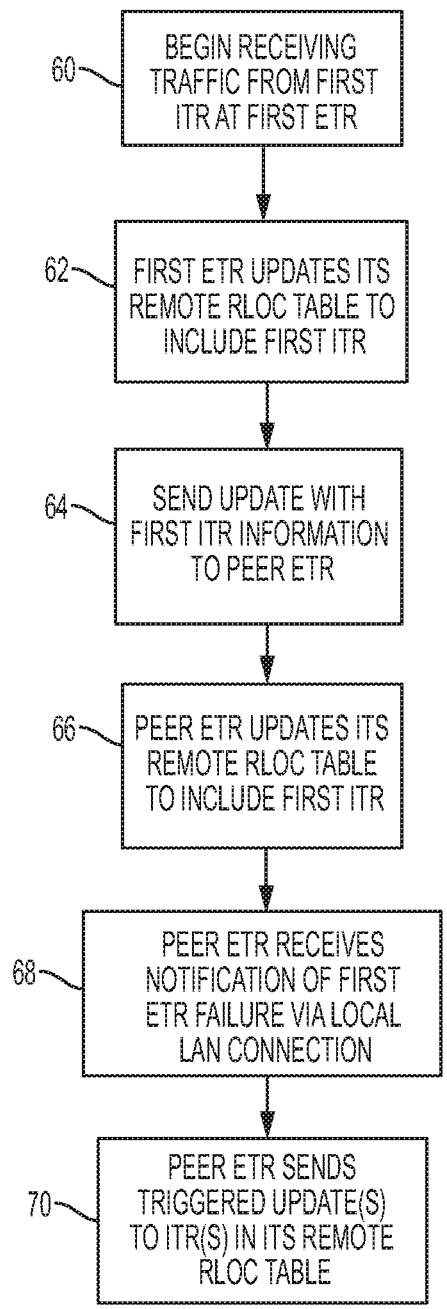
FIG. 4 illustrates a flowchart showing example steps of a technique for optimizing ETR failure scenarios in an iWAN or other LISP-enabled network in accordance with embodiments described herein.

FIG. 4 is a flowchart illustrating steps that may be performed by each ETR of FIG. 3 in implementing techniques described herein for optimizing ETR failure scenarios in an iWAN or any other LISP-enabled network in accordance with embodiments described herein. Referring to FIG. 4, in step 60, a first ETR at a local site (e.g., a data center) begins receiving traffic from a first ITR at a remote site. In step 62, the first ETR updates its remote RLOC table (or cache) to include the first ITR. In step 64, the first ETR sends an update to a peer ETR via a LAN connection with the first ITR information. In step 66, upon receipt of the update from the first ETR including the first ITR information, the peer ETR updates its own remote RLOC table (cache) to include the first ITR. In step 68, upon subsequent failure of the first ETR, the peer ETR receives notification of the first ETR failure via the local LAN connection. In step 70, the peer ETR sends triggered updates to the ITRs in its remote RLOC table to notify the ITRs with which the first ETR had been communicating that the first ETR is down. At that point, the ITRs may take whatever action necessary to ensure proper response and connectivity.

In example implementations, at least some portions of the activities related to the techniques described herein may be implemented in software in, for example, a server, a router, etc. In some embodiments, this software could be received or downloaded from a web server, provided on computer-readable media, or configured by a manufacturer of a particular element in order to provide this system in accordance with features of embodiments described herein. In some embodiments, one or more of these features may be implemented in hardware, provided external to these elements, or consolidated in any appropriate manner to achieve the intended functionality.

Figure 5:
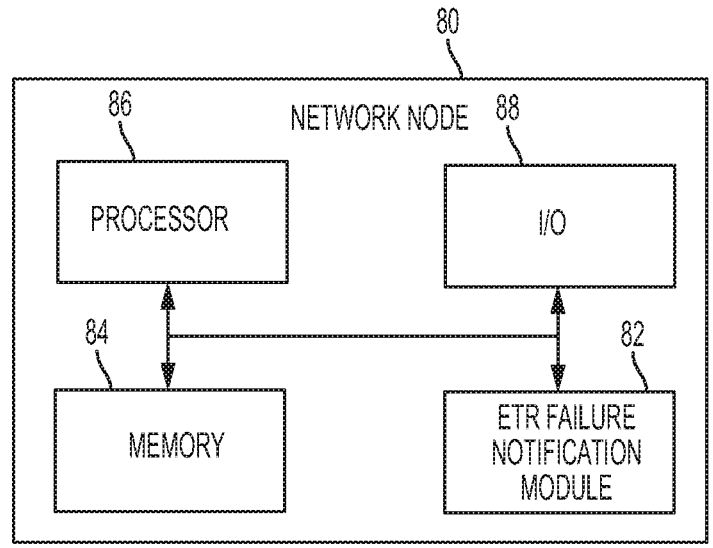
FIG. 5 is a simplified block diagram of a network element, such as an ETR of FIG. 3, configured for implementing techniques for optimizing ETR failure scenarios in an iWAN or other LISP-enabled network in accordance with embodiments described herein.

For example, referring to FIG. 5, a network node 80, which may be implemented as an xTR or an ETR, may include an ETR failure detection module 82 comprising software embodied in one or more tangible media for facilitating the activities described herein. In particular, the module 82 may comprise software for facilitating the processes illustrated in and described with reference to FIG. 4. The node 80 may also include a memory device 84 for storing information to be used in achieving the functions as outlined herein. For example, remote RLOC table may be stored in memory device 84. Additionally, the node 80 may include a processor 86 that is capable of executing software or an algorithm (such as embodied in module 82) to perform the functions as discussed in this Specification. The node 80 may also include various I/O 88 necessary for performing functions described herein.

Advantages of embodiments described herein include, but are not limited to, the fact that triggered updates, such as those described above, perform and scale better in large environments. Additionally, embodiments described herein reduce the wait time (from upwards of 60 seconds previously) and reduce the amount of control traffic on the WAN/LAN fabrics required to provide ETR failure notifications to ITRs. Moreover, embodiments described herein do not depend on sending /32 across WAN/LAN fabric. Still further, the fact that only ITRs that had been communicating with the site of the down ETR are updated avoids unnecessary updates and notifications. Finally, there is no hardware or bidirectional traffic dependency in the herein-described techniques, in contrast to techniques that rely on utilization of LSB bits.

Figure 6:
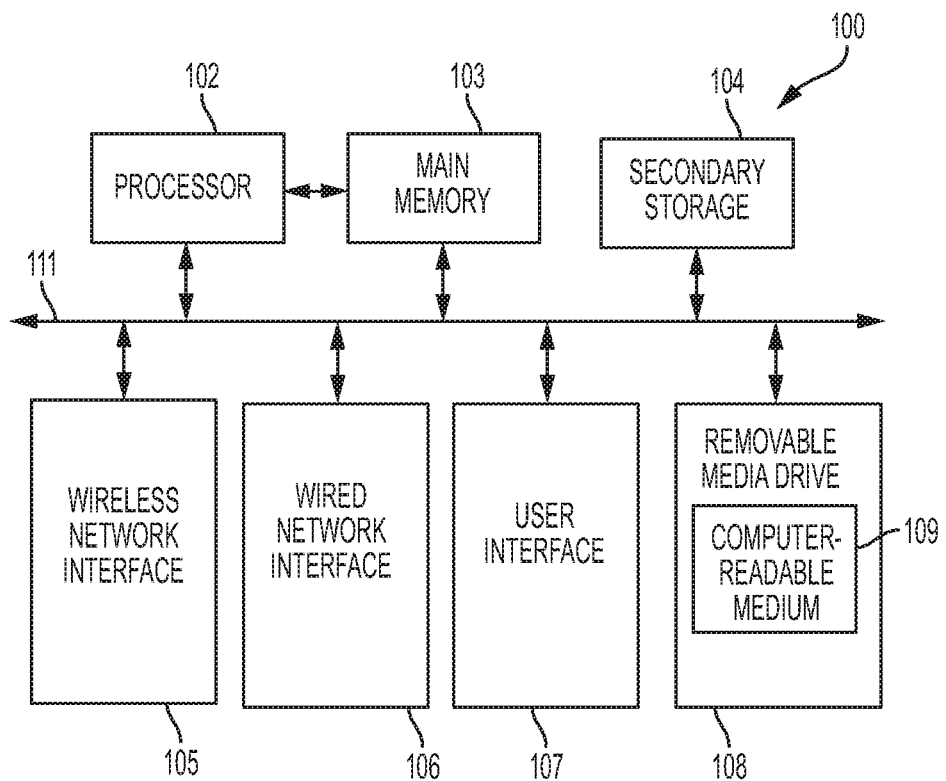
FIG. 6 is a simplified block diagram of a machine comprising an element of a communications network in which techniques for optimizing ETR failure scenarios in an iWAN or other LISP-enabled network in accordance with embodiments described herein may be implemented.

Turning now to FIG. 6, illustrated therein is a simplified block diagram of an example machine (or apparatus) 100, which in certain embodiments may be an SDN node, that may be implemented in embodiments described herein. The example machine 100 corresponds to network elements and computing devices that may be deployed in a communications network, such as an SDN node. In particular, FIG. 6 illustrates a block diagram representation of an example form of a machine within which software and hardware cause machine 100 to perform any one or more of the activities or operations discussed herein. As shown in FIG. 6, machine 100 may include a processor 102, a main memory 103, secondary storage 104, a wireless network interface 105, a wired network interface 106, a user interface 107, and a removable media drive 108 including a computer-readable medium 109. A bus 101, such as a system bus and a memory bus, may provide electronic communication between processor 102 and the memory, drives, interfaces, and other components of machine 100.

Processor 102, which may also be referred to as a central processing unit ("CPU"), can include any general or special-purpose processor capable of executing machine readable instructions and performing operations on data as instructed by the machine-readable instructions. Main memory 103 may be directly accessible to processor 102 for accessing machine instructions and may be in the form of random access memory ("RAM") or any type of dynamic storage (e.g., dynamic random access memory ("DRAM")). Secondary storage 104 can be any non-volatile memory such as a hard disk, which is capable of storing electronic data including executable software files. Externally stored electronic data may be provided to computer 100 through one or more removable media drives 108, which may be configured to receive any type of external media such as compact discs ("CDs"), digital video discs ("DVDs"), flash drives, external hard drives, etc.

Wireless and wired network interfaces 105 and 106 can be provided to enable electronic communication between machine 100 and other machines, or nodes. In one example, wireless network interface 105 could include a wireless network controller ("WNIC") with suitable transmitting and receiving components, such as transceivers, for wirelessly communicating within a network. Wired network interface 106 can enable machine 100 to physically connect to a network by a wire line such as an Ethernet cable. Both wireless and wired network interfaces 105 and 106 may be configured to facilitate communications using suitable communication protocols such as, for example, Internet Protocol Suite ("TCP/IP"). Machine 100 is shown with both wireless and wired network interfaces 105 and 106 for illustrative purposes only. While one or more wireless and hardwire interfaces may be provided in machine 100, or externally connected to machine 100, only one connection option is needed to enable connection of machine 100 to a network.

A user interface 107 may be provided in some machines to allow a user to interact with the machine 100. User interface 107 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, etc.

Removable media drive 108 represents a drive configured to receive any type of external computer-readable media (e.g., computer-readable medium 109). Instructions embodying the activities or functions described herein may be stored on one or more external computer-readable media. Additionally, such instructions may also, or alternatively, reside at least partially within a memory element (e.g., in main memory 103 or cache memory of processor 102) of machine 100 during execution, or within a non-volatile memory element (e.g., secondary storage 104) of machine 100. Accordingly, other memory elements of machine 100 also constitute computer-readable media. Thus, "computer-readable medium" is meant to include any medium that is capable of storing instructions for execution by machine 100 that cause the machine to perform any one or more of the activities disclosed herein.

Not shown in FIG. 6 is additional hardware that may be suitably coupled to processor 102 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc. Machine 100 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 100 to appropriately manage the operation of the hardware components therein.

The elements, shown and/or described with reference to machine 100, are intended for illustrative purposes and are not meant to imply architectural limitations of machines such as those utilized in accordance with the present disclosure. In addition, each machine may include more or fewer components where appropriate and based on particular needs. As used herein in this Specification, the term "machine" is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities described herein may be implemented in software in. In some embodiments, this software could be received or downloaded from a web server, provided on computer-readable media, or configured by a manufacturer of a particular element in order to implement the embodiments described herein. In some embodiments, one or more of these features may be implemented in hardware, provided external to these elements, or consolidated in any appropriate manner to achieve the intended functionality.

Furthermore, in the embodiments described and illustrated herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., main memory 103, secondary storage 104, computer-readable medium 109) can store data used in implementing embodiments described and illustrated herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 102) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM")), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of communications network described herein may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by network environment, could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to myriad other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 142 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
receiving, at a first network node, traffic from a second network node via a first network that is a Location Identifier Separation Protocol (LISP)-enabled network; and
in response to receiving the traffic, generating and sending, by the first network node to a third network node, a first update including information identifying the second network node, wherein the first and third network nodes are egress tunnel routers that are peer nodes interconnected via a Local Area Network ("LAN") connection different from the first network and wherein the information identifying the second network node is sent from the first network node to the third network node via the LAN connection,
wherein subsequent to receipt of the information identifying the second network node, the third network node updates a locator table configured using the LISP that is maintained by the third network node to include an entry corresponding to the second network node, wherein the entry includes the information identifying the second network node received by the third network node from the first network node, and
wherein based on receipt by the third network node via the LAN connection of a notification that the first network node has failed, the third network node sends a second update, via the first network, only to network nodes including the second network node, that have a corresponding table entry in the locator table indicating that the first network node has failed and to cease communication therewith.

2. The method of claim 1 further comprising:
subsequent to receiving the traffic, updating by the first network node, another locator table maintained by the first network to include another entry corresponding to the second network node and including the information identifying the second network node sent by the first network node to the third network node.

3. The method of claim 1, wherein the second network node comprises an ingress tunnel router and is connected to the first network node and to the third network node via the LISP-enabled network.

4. The method of claim 1, wherein the locator table comprises a remote routing locator table and the table entry includes an RLOC of the second network node.

5. The method of claim 1, wherein upon receipt by the third network node via the LAN connection of the notification that the first network node has failed, the third network node sends a plurality of updates only to the network nodes that have the corresponding table entry in the locator table indicating that the first network node has failed and to cease the communication therewith, wherein each of the plurality of updates is sent at a predetermined interval.

6. The method of claim 1, wherein each of the first and third network nodes stores the locator table comprising a remote routing locator table (RLOC), and
wherein, based on the receiving the traffic, the first network node updates the RLOC of the first network node and generates and sends the first update so that the third network node updates the RLOC of the third network node.

7. The method of claim 1, wherein sending the second update includes the third network node sending a plurality of second updates to each of one or more network nodes identified in the locator table.

8. The method of claim 1, further comprising:
based on the receipt, by the third network node, via the LAN connection, of the notification that the first network node has failed, retrieving, by the third network node, each of a plurality of table entries in the locator table of the third network node, wherein each of the plurality of table entries in the locator table identifies a respective ingress tunnel router (ITR) that is remotely communicating with the first network node via the first network; and
sending, by the third network node, via the first network, the second update to each of the respective ITR, indicating that the first network node has failed and to cease the communication therewith.

9. One or more non-transitory tangible media that include code for execution and when executed by a processor is operable to perform operations comprising:
receiving, at a first network node, traffic from a second network node via a first network that is a Location Identifier Separation Protocol (LISP)-enabled network; and
in response to receiving the traffic, generating and sending, by the first network node to a third network node, a first update including information identifying the second network node, wherein the first and third network nodes are egress tunnel routers that are peer nodes interconnected via a Local Area Network ("LAN") connection different from the first network and wherein the information identifying the second network node is sent from the first network node to the third network node via the LAN connection,
wherein subsequent to receipt of the information identifying the second network node, the third network node updates a locator table configured using the LISP that is maintained by the third network node to include an entry corresponding to the second network node, wherein the entry includes the information identifying the second network node received by the third network node from the first network node, and
wherein based on receipt by the third network node via the LAN connection of a notification that the first network node has failed, the third network node sends a second update, via the first network, only to network nodes, including the second network node, that have a corresponding table entry in the locator table indicating that the first network node has failed and to cease communication therewith.

10. The media of claim 9, wherein the operations further comprise:
subsequent to receiving the traffic, updating, by the first network node, another locator table maintained by the first network to include another entry corresponding to the second network node and including the information identifying the second network node sent by the first network node to the third network node.

11. The media of claim 9, wherein the second network node comprises an ingress tunnel router and is connected to the first network node and to the third network node via the LISP-enabled network.

12. The media of claim 9, wherein the locator table comprises a remote routing locator table and the table entry includes an RLOC of the second network node.

13. The media of claim 9, wherein upon receipt by the third network node via the LAN connection of the notification that the first network node has failed, the third network node sends a plurality of updates only to the network nodes that have the corresponding table entry in the locator table indicating that the first network node has failed and to cease the communication therewith, wherein each of the plurality of updates is sent at a predetermined interval.

14. The media of claim 9, wherein each of the first and third network nodes stores the locator table comprising a remote routing locator table (RLOC) and wherein the operations further comprise, based on the receiving the traffic, updating the RLOC of the first network node and the sending of the update is to update the RLOC of the third network node.

15. An apparatus comprising:
a memory element configured to store data; and
a processor operable to execute instructions associated with the data;
the processor configured for:
receiving, at a first network node, traffic from a second network node via a first network at a Location Identifier Separation Protocol (LISP)-enabled network; and
in response to receiving the traffic, generating and sending, by the first network node to a third network node, a first update including information identifying the second network node, wherein the first and third network nodes are egress tunnel routers that are peer nodes interconnected via a Local Area Network ("LAN") connection different from the first network and wherein the information identifying the second network node is sent from the first network node to the third network node via the LAN connection,
wherein subsequent to receipt of the information identifying the second network node, the third network node updates a locator table configured using the LISP that is maintained by the third network node to include an entry corresponding to the second network node, wherein the entry includes the information identifying the second network node received by the third network node from the first network node, and
wherein based on receipt by the third network node via the LAN connection of a notification that the first network node has failed, the third network node sends a second update, via the first network, only to network nodes, including the second network node, that have a corresponding table entry in the locator table indicating that the first network node has failed and to cease communication therewith.

16. The apparatus of claim 15 further configured for:
subsequent to receiving the traffic, updating, by the first network node, another locator table maintained by the first network to include another entry corresponding to the second network node and including the information identifying the second network node sent by the first network node to the third network node.

17. The apparatus of claim 15, wherein the second network node comprises an ingress tunnel router and is connected to the first network node and to the third network node via the LISP-enabled network.

18. The apparatus of claim 15, wherein the locator table comprises a remote routing locator table and the table entry includes an RLOC of the second network node.

19. The apparatus of claim 15, wherein upon receipt by the third network node via the LAN connection of the notification that the first network node has failed, the third network node sends a plurality of updates only to the network nodes that have the corresponding table entry in the locator table indicating that the first network node has failed and to cease the communication therewith, wherein each of the plurality of updates is sent at a predetermined interval.

20. The apparatus of claim 15, wherein each of the first and third network nodes stores which store the locator table comprising a remote routing locator table (RLOC) and wherein the processor is further configured to, based on the receiving the traffic, update the RLOC of the first network node and send the update so as to update the RLOC of the third network node.

* * * * *